July 22, 1947.   G. T. McCLURE   2,424,480
FLUID PRESSURE BRAKE APPARATUS
Filed Nov. 6, 1945   2 Sheets-Sheet 2

RELEASE POSITION

RELEASE POSITION

ALL APPLICATION POSITIONS

INVENTOR
GLENN T. McCLURE
BY
ATTORNEY

Patented July 22, 1947

2,424,480

UNITED STATES PATENT OFFICE 2,424,480

FLUID PRESSURE BRAKE APPARATUS

Glenn T. McClure, McKeesport, Pa., assignor to The Westinghouse Air Brake Company, Wilmerding, Pa., a corporation of Pennsylvania Application November 6, 1945, Serial No. 627,064

11 Claims. (Cl. 303—66)

This invention relates to fluid pressure brake equipment of the automatic type embodying a brake pipe, and more particularly to means for controlling the supply of fluid under pressure to, or charging of, said brake pipe.

The usual locomotive brake equipment embodies an engineer's automatic brake valve device and a feed valve device for controlling the supply of fluid under pressure from the main reservoir to the brake pipe on a train, the brake valve device having two charging positions known as release position and running position. In charging the brake pipe on a train the brake valve device is generally first moved to the release position to rapidly increase the pressure in the brake pipe and thereby effect a quick release of the brakes, and after a certain length of time in this position is then moved to running position in which the feed valve device maintains the brake pipe at its normal pressure.

In Patent No. 2,314,397, issued March 23, 1943, to Ellis E. Hewitt, and assigned to the assignee of the present invention, there is disclosed a locomotive brake equipment embodying a feed valve device having greater flow capacity than theretofore employed and a brake valve device having large flow capacity ports, cavities, etc., for connecting the feed valve device to the brake pipe in the release position to effect a rapid increase in the pressure in the brake pipe. In the usual locomotive equipment prior to the conception and teaching of the above mentioned Hewitt patent, when the brake valve device was moved to release position, a direct communication was established between the main reservoir and brake pipe so that fluid at the high pressure might flow directly to the brake pipe to obtain the same result.

It has been found desirable in some kinds of road service to provide for the engineer of the locomotive a brake valve device having selective means whereby the brake pipe may be charged in release position of the brake valve device either at the pressure of fluid in the main reservoir or at the pressure of fluid delivered by the feed valve device. An object of this invention, therefore, is to provide a brake valve device embodying means whereby this desirable feature may be obtained.

Another object is to provide an improved brake valve device.

A further object is to provide selective means for obtaining the above mentioned feature by making but few alterations in the usual brake valve device.

Other objects and advantages will be apparent from the following detailed description, taken in connection with the accompanying drawings, wherein.

Figure 2:
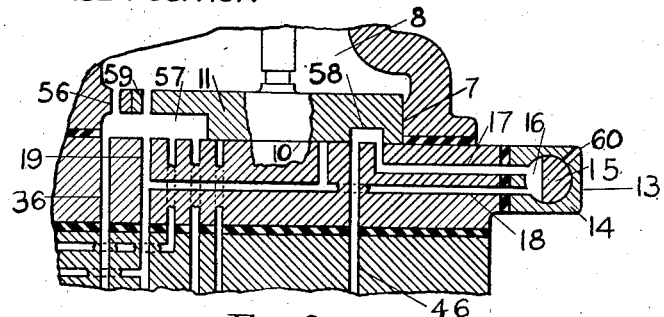
Fig. 2 is a view similar to a portion of the brake valve device shown in Fig. 1 but with the rotary valve shown in release position.
Figure 3:
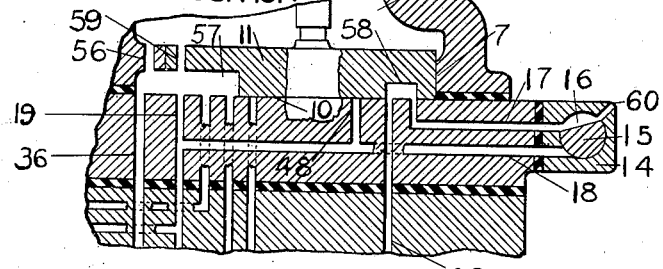
Figure 4:
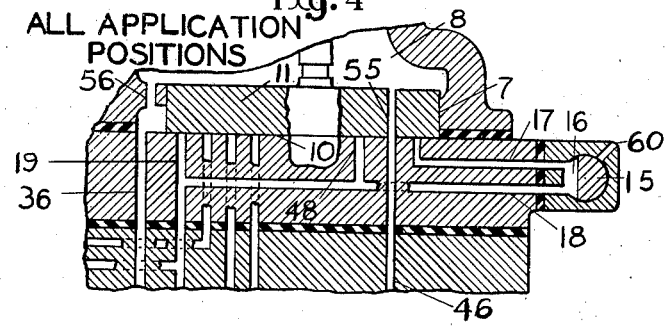

Fig. 3 is a view similar to Fig. 2 but showing the selector cock positioned so as to establish communications whereby the feed valve device is conditioned to deliver fluid by way of the brake valve device to the brake pipe at main reservoir pressure; and, Fig. 4 is a view similar to Fig. 3 showing what pertinent communications are established by the rotary valve in all positions other than release position and running position.

Figure 1:
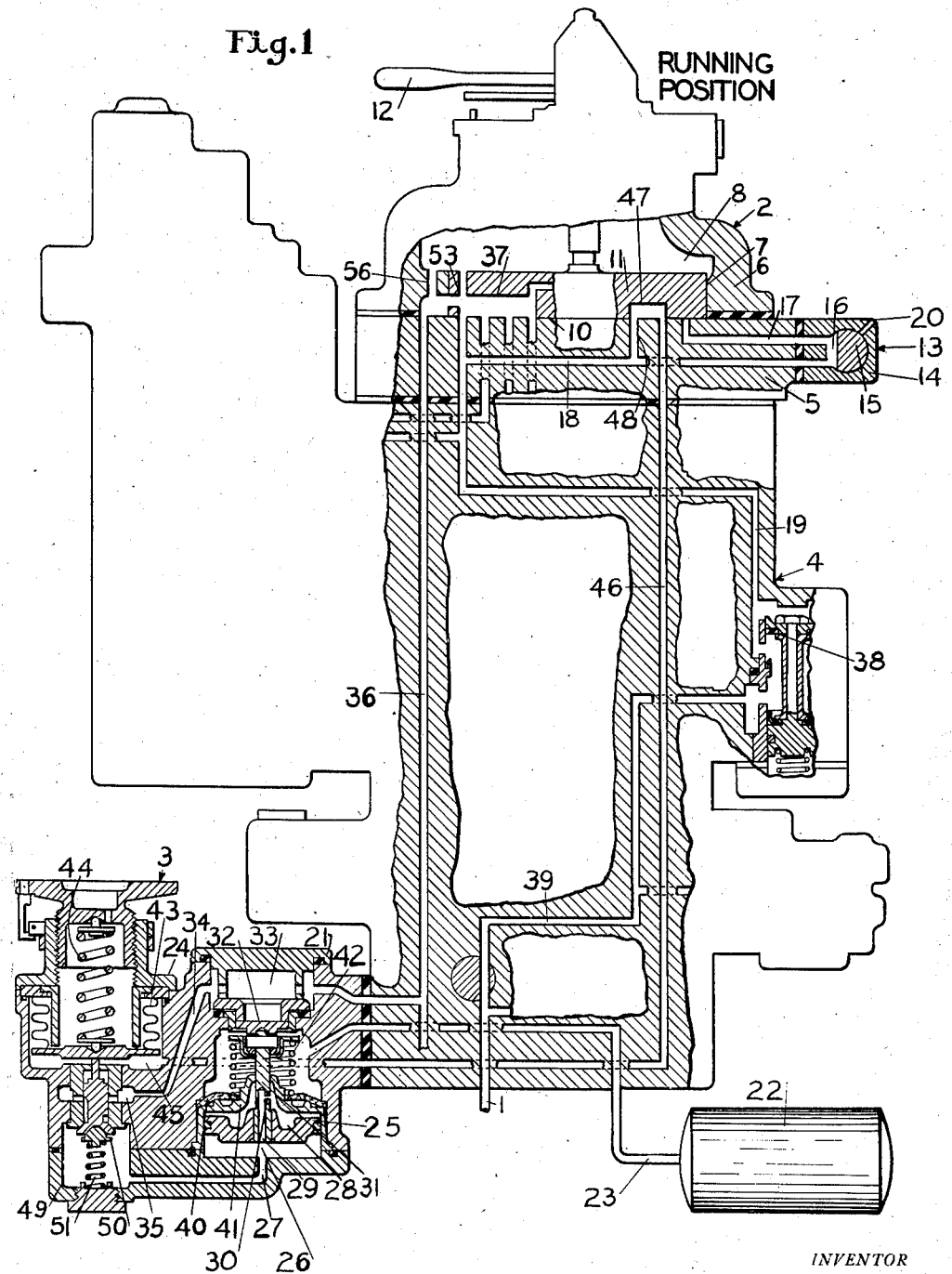
Fig. 1 is a diagrammatic view, partly in section and partly in outline, of the improved brake pipe charging control means including a brake valve device in elevation with certain parts broken away to show the relation of the pertinent communications when the brake valve device is in running position.

In Fig. 1 the reference numeral 1 indicates the brake pipe on a locomotive, which is adapted to be coupled to the brake pipe on a train in the usual manner, and associated therewith is the improved charging means for the brake pipe 1, which means comprises an engineer's automatic brake valve device 2 and a feed valve device 3.

The brake valve device 2 comprises a pipe bracket 4, a rotary valve seat portion 5, and a rotary valve housing portion 6, which are rigidly secured together in the order named by the usual bolting means (not shown) and with the rotary valve housing portion 6 on top as shown in Fig. 1. The rotary valve housing portion 6 has a bore 7 which is open at its upper end to a rotary valve chamber 8. The rotary valve seat portion extends into the lower end of this bore 7, which is provided on its end with a rotary valve seat 10. Mounted for rotation on the valve seat 10 is a rotary valve 11 which has a neat turning fit in the bore 7. The rotary valve 11 is operatively connected in the usual manner to an operating handle 12, which handle is adapted to be operated by the engineer of a locomotive, for turning said valve to its different brake controlling positions including release position and running position for controlling the supply of fluid under pressure to the brake pipe 1, and the usual brake application positions for venting fluid under pressure from said brake pipe.

For selecting the desired operation of the feed valve device 3 when the rotary valve 11 is in release position, in a manner hereinafter more fully described, there is mounted at one side of the rotary valve seat portion 5 a selector cock 13 comprising a casing 14 having operatively mounted therein a plug valve 15. The plug valve 15 is provided with a waterway 16 which may, as shown in Fig. 1, establish communication between a feed valve control passage 17 leading to the rotary valve seat 10 and a control passage 18 leading to the rotary valve seat and also to a brake pipe supply passage 19 formed in the pipe bracket 4. As will be seen upon referring to Fig. 3, the plug valve 15 may also be positioned so that the waterway 16 establishes communication between the control passage 17 and an atmospheric passage 20 formed in the casing 14.

As shown in Fig. 1, the feed valve device 3 may be mounted on one side of the pipe bracket 4 in the usual manner and comprises a supply portion 21, which operates to supply fluid under pressure received from a main reservoir 22 by way of a pipe and passage 23 to the brake pipe 1 by way of the brake valve device 2, and a regulating portion 24 which controls the operation of the supply portion and the pressure of the fluid thus supplied to the brake pipe. The supply portion 21 embodies a piston 25 having at one side a control chamber 26, which is in open communication by way of passage 27 with the regulating portion 24, and at the other side a valve chamber 28 which is connected by way of the pipe and passage 23 to the main reservoir 22. A passage 29 leads through the piston 25 to establish communication between the chambers 26 and 28, which communication is restricted by a choke 30 in said passage. Contained in the valve chamber 28 and mounted on a stem 31 of the piston 25 for movement therewith is a valve 32 which valve controls communication between the valve chamber 28 and a delivery chamber 33, the latter chamber being open by way of a passage 34 to a chamber 35 in the regulating portion 24 and, when the handle 12 is in running position as shown in Fig. 1, with the brake pipe 1 by way of a passage 36, a port or cavity 37 in rotary valve 11, passage 19 and a normally unseated cut-off valve 38 and a passage 39. Interposed between and operatively engaging the valve 32 and a strainer 40 operatively mounted on a piston guide 41 is a spring 42 which constantly urges said valve toward its seated position in which it is shown in Fig. 1.

For controlling the pressure of fluid in the control chamber 26 the regulating portion 29 is provided with a flexible diaphragm 43 preferably of the bellows type and subject on one side to the force of an adjustable regulating spring 44. At the opposite side of the diaphragm 43 is a chamber 45 which, as shown in Fig. 1, may be connected to the control passage 18 by way of a passage 46 leading to the rotary valve seat 10, a cavity 47 in the rotary valve 11, and a passage 48. A chamber 49 which is connected by way of the passage 27 to the control chamber 26 in the supply portion 21 is also connected to the chamber 45 through a bore in which is slidably mounted the fluted stem of a regulating valve 50, said stem engaging the diaphragm 43. When the force of the regulating spring 42 exceeds the pressure of fluid in the chamber 45, the diaphragm 43 becomes operative to unseat the valve 50, and when less, a bias spring 51 contained in the chamber 49 becomes effective to seat said valve.

Operation

In running position, as shown in Fig. 1, the pressure of fluid in the brake pipe 1 is supplied to the diaphragm chamber 45 in the regulating portion 24 of the feed valve device 3 by way of passage 39, past the unseated cut-off valve 38, passages 19 and 18 in the pipe bracket 4, passage 48 in the rotary valve seat 10, cavity 47 in the rotary valve 11 and feed valve control passage 46. When this pressure in chamber 45 is below the value determined by the adjustment of the regulating spring 44, the diaphragm 43 will be caused to deflect downwardly against the valve 50, unseating said valve against the opposing pressure of the bias spring 51. Let it be assumed that chamber 26 of the supply portion 21 had previously been charged at a relatively slow rate to the pressure of the main reservoir 22 by way of pipe and passage 23, valve chamber 28, choke 30 and passage 29 in the piston 25. With valve 50 now unseated, fluid in chamber 26 at main reservoir pressure flows by way of passage 27 to chamber 49, past the valve 50 to control chamber 35, thence by way of passage 34 and chamber 33 in the feed valve device 3, and passage 36 to the rotary valve seat 10, through port and cavity 37 in the rotary valve 11 to passage 19, whence it flows past unseated cut-off valve 38 to passage 39 and the brake pipe 1. However, by reason of the choke 30 in passage 29, fluid will flow away from chamber 26 faster than it can be supplied from chamber 28 through the passage 29. The consequent reduction in pressure of fluid in chamber 26 acting on the lower face of the piston 25 will permit the higher pressure of fluid in chamber 28, acting on the opposite side of the piston, to cause the piston to move downwardly against the opposing pressure of the spring 42, carrying therewith, through the medium of the piston stem 31, the valve 32 to an unseated position. With the valve 32 unseated, fluid at main reservoir pressure may flow directly from chamber 28 to chamber 33 and thence, by the route just described, to the brake pipe 1. As the brake pipe pressure builds up, it will approach the value for which the spring 44 is set, the consequent rise in the pressure of fluid in the chamber 45 acting on the diaphragm 43 will overcome the force of the spring 44 and will cause the diaphragm to deflect upwardly, thereby permitting the bias spring 51 to seat the valve 50 again. With the flow of fluid under pressure from chamber 26 thus cut off, the fluid pressures on opposite sides of the piston 25 will again be equalized by way of choke 30 and passage 29, permitting the spring 42 to move the valve 32 in an upwardly direction to the seated position in which it is shown.

Now when the engineer operates the brake valve device 3 to effect an application of the brakes on the locomotive and cars, the rotary valve 11 will be rotated to a position in which the pertinent port connections will be established in the manner shown in Fig. 4. By reason of the cavity 47 now being out of register with passages 46 and 48 the aforementioned communication between the control chamber 45 and the brake pipe 1 will be cut off. Likewise communication between the control chamber 45 and the rotary valve chamber 8 by way of said passages, passages 18 and 19, cavity 52, a port 53 through the rotary valve 11 will be cut off. However, the control chamber 45 will be connected to the rotary valve chamber 8 by way of passage 46 and a passage 55 which extends through the rotary valve 11. Fluid at the regulated pressure is supplied from chamber 35 in the regulating portion 24 by way of passage 34, chamber 33, passage 36 and a passage 56 located in the rotary valve housing portion 6. Thus, the feed valve operation will be controlled by the feed valve delivery pressure present in chamber 8.

As previously stated, it is the usual practice for the engineer to first move the handle 12 of the brake valve device 2 to release position to effect a quick release of the train brakes and, after a certain length of time in this position, to then move the handle to running position to continue the charging of the brake pipe 1 so as to maintain the desired brake pipe pressure with the brakes released.

As shown in Fig. 2, the plug valve 15 of the selector cock 13 may be positioned, to effect, in release position, the normal operation of the feed valve device 3, that is, to control the operation of the feed valve device according to the pressure of fluid in the brake pipe and in a large brake pipe charging cavity 57 in the rotary valve 11. In this position of the plug valve 15, passage 17 is connected by way of the waterway 16 in the plug valve 15 to the passage 18. When the brake valve handle is moved to release position, the rotary valve 11 is rotated to a position in which passage 17 is connected by way of a cavity 58 in the rotary valve to the feed valve control passage 46. Since the brake pipe pressure had just previously been reduced in effecting an application of the brakes in the usual well known manner, at which time the pressure of fluid in the diaphragm chamber 45 of the regulating portion 24 had been maintained at feed valve pressure, fluid under pressure will now flow from the chamber 45 to the brake pipe 1 by way of the passage 46, a cavity 58, passage 17, waterway 16, passages 18 and 19, past cut-off valve 38 and then by way of passage 39. The resulting reduction in the pressure of fluid in the diaphragm chamber 45 will permit the spring to act through the medium of the diaphragm 33 to unseat the valve 50, thereby permitting fluid in chamber 26 at substantially main reservoir pressure to flow by way of passage 27 and chamber 49 to chamber 35. As in the previously described operation, by reason of the choke 30 in the passage 29 of the piston 25 the consequent reduction of pressure in chamber 26 will permit the higher pressure of fluid in chamber 28 acting on said piston to effect the unseating of valve 32. Fluid in chamber 28 at substantially main reservoir pressure will flow past the unseated valve to brake pipe 1 by the same route as that described for running position of the brake valve in connection with Fig. 1, except flow to the rotary valve chamber 8 will be by way of the port 59.

It will be seen that under the conditions shown in Fig. 2 the pressure utilized for controlling the operation of the feed valve device 3 is substantially the same as that utilized in running position of the brake valve. It should be understood however that the flow capacity for charging the brake pipe is much greater with the brake valve in release position than in running position. It should be noted that the route of the communication of control pressure to the diaphragm chamber 45 is now directed first through waterway 16 in the plug valve 15 of the cock 13 and then the cavity 58 in the rotary valve 11. When, after the proper interval of time, the engineer returns the handle of the brake valve 2 to running position, cavity 58 will be closed off, thus eliminating the effectiveness of the selector cock 13, and feed valve control according to brake pipe pressure in passage 18 will again be established by way of cavity 47 and passage 48.

If the engineer wishes to effect a release of the brakes by charging the brake pipe with a continuous flow of fluid at main reservoir pressure that is, without feed valve control so long as the brake valve is in release position, he may before releasing the brakes turn the plug valve 15 of the selector cock 13 to the position in which it is shown in Fig. 3. In this position passage 17 is now connected to atmosphere by way of the waterway 16 and an atmospheric port 60, and passage 18, which is always connected to the brake pipe supply passage 19, will be blocked off. As previously noted, with the rotary valve 11 in brakes applied position as shown in Fig. 4, the fluid in diaphragm chamber 45 of the feed valve device 3 is maintained at feed valve pressure by reason of port 55 through the rotary valve connecting feed valve control passage 46 to the rotary valve chamber 8, the latter chamber being connected to the feed valve supply passage 36 by way of the port 56. Under this condition the feed valve was in its normal position ready to operate to control the pressure of fluid being supplied to the brake pipe to effect a release of the brakes.

Under the present conditions, when the engineer moves the handle to release position in the usual manner, the feed valve communications will be established as shown in Fig. 3. Fluid at feed valve pressure in the diaphragm chamber 45 will flow to atmosphere by way of passage 46, cavity 58 in the rotary valve 11, passage 17, waterway 16 in the plug valve 15 and atmospheric vent 60 in the casing 14. As before a reduction in the pressure of fluid in chamber 45 will permit the force of spring 44 to act to unseat the valve 50, causing a reduction in the pressure of fluid in chamber 26 and the unseating of the valve 32 by the downward movement of the piston 25 in response thereto. Fluid at main reservoir pressure in chamber 28 will flow to the brake pipe 1 by way of passage 36, port and cavity 57, passage 19, past cut-off valve 38 and then by way of passage 39. Main reservoir pressure will also be established in the rotary valve chamber 8 by reason of the connection between cavity 57 and said chamber by way of passage 59 through the rotary valve seat 11.

However, fluid at main reservoir pressure in connected control passage 18 will not be communicated to control passage 46 and diaphragm chamber 35. Communication by way of the selector cock 13 is cut off by the plug valve 15 while communication by way of passage 48 and cavity 47 is cut off by the rotary valve 11. With no fluid under pressure in chamber 45, the spring 44 will hold the valve 50 unseated. Since no pressure can be built up in chamber 26 as long as valve 50 is unseated, it follows that supply valve 32 will remain unseated and fluid at main reservoir pressure will continue to flow to brake pipe. Thus, it will be seen that the brake pipe will continue to be supplied with fluid at main reservoir pressure so long as, and only when, the feed valve communications as shown in Fig. 3 are established.

*Summary*

Summarizing, it will be seen that, with the selector cock 13 in its normal position as shown in Figs. 1, 2 and 4, manipulation of the brake valve will effect the operation of the brakes on the locomotive and the train in the usual manner. Particularly, in release position the brake pipe will be charged by a high rate of flow of fluid at feed valve controlled pressure. When the engineer wishes to charge the brake pipe with fluid at main reservoir pressure when the brake valve is in release position, he will position the selector cock as shown in Fig. 3 before moving the brake valve to release position. Then when the brake valve is moved to release position, the control chamber 45 will be vented to atmosphere by way of the communication through the rotary valve 11 and the selector cock 13, thereby nullifying the control of the feed valve device 3 and permitting fluid to flow to brake pipe at a constant main reservoir pressure. When the brake valve is returned to running the aforementioned communication to atmosphere will be cut off at the rotary valve and the feed valve device will again be operative to control the pressure of fluid supplied to the brake pipe.

Having now described my invention, what I claim as new and desire to secure by Letters Patent is:

1. In a fluid pressure brake apparatus including a brake pipe and a normally charged reservoir from which fluid under pressure may be supplied to said brake pipe, the combination of a feed valve device for controlling the supply of fluid under pressure from said reservoir to said brake pipe, said feed valve device comprising means which when subjected to fluid at brake pipe pressure functions to limit the pressure of fluid supplied from the reservoir to the brake pipe, and which when subjected to fluid at atmospheric pressure functions to supply fluid from the reservoir to the brake pipe without limitation, a brake valve having means therein which in release position of the valve establishes a communication through which fluid under pressure being supplied to the brake pipe also flows to the feed valve means, and means operative to cut off the flow of fluid to said feed valve means and to subject said feed valve means to fluid at atmospheric pressure.

2. In a fluid pressure brake including a brake pipe and a main reservoir for supplying fluid under pressure to said brake pipe, the combination with a feed valve device having a control chamber and operative in response to fluid pressure in said chamber to limit the pressure of fluid supplied from the main reservoir to the brake pipe, of a brake valve device comprising a rotary valve having a release position and manually operable selective means cooperating with said rotary valve when the rotary valve is in release position to control the supply of fluid under pressure to said control chamber, said selective means comprising a plug valve having one position in which communication is established between brake pipe delivery pressure and said control chamber and another position in which said communication is cut off and said control chamber connected to atmosphere.

3. In a fluid pressure brake, the combination of a brake pipe, a main reservoir for supplying fluid under pressure to said brake pipe, a feed valve device operative in response to control fluid pressure from another source to limit the pressure of fluid supplied from said main reservoir to said brake pipe, a brake valve device having a position for opening communication between said feed valve device and said brake pipe, and selective means having two positions and cooperative with said brake valve device in one of the two positions for supplying fluid pressure from said brake valve device to said feed valve device for controlling the operation of the feed valve device and in the other of the two positions for eliminating the supply of control fluid pressure to said feed valve device and thereby rendering the feed valve device inoperative to limit the pressure of fluid supplied from said main reservoir to said brake pipe.

4. In a fluid pressure brake, the combination of a brake pipe, a main reservoir for supplying fluid under pressure to said brake pipe, a feed valve device having a control chamber and operative in response to fluid pressure in said chamber to limit the pressure of fluid supplied from said main reservoir to said brake pipe, a brake valve device having a position for opening communication between said feed valve device and said brake pipe, and selective valve means for controlling the operation of said feed valve device when said brake valve device is in said position, said means being operable to one position to supply fluid at substantially brake pipe pressure to said control chamber and thereby limit the pressure of fluid supplied to the brake pipe and being operable to another position for reducing the pressure of fluid in said control chamber to atmosphere and thereby render the feed valve device inoperative to limit the pressure of fluid supplied from said main reservoir to the brake pipe.

5. In a fluid pressure brake, the combination of a brake pipe, a main reservoir for supplying fluid under pressure to said brake pipe, a feed valve device having a control chamber and operative in response to fluid pressure in said chamber to limit the pressure of fluid supplied from said main reservoir to said brake pipe, a brake valve device having a position for opening communication between said feed valve device and said brake pipe, and selective valve means for controlling the operation of said feed valve device when said brake valve device is in said position, said means being operable to one position to supply fluid pressure in said communication to said control chamber and thereby limit the pressure of fluid supplied to the brake pipe and being operable to another position for reducing the pressure of fluid in said control chamber to atmosphere and thereby render the feed valve device inoperative to limit the pressure of fluid supplied from said main reservoir to the brake pipe.

6. In a fluid pressure brake, the combination of a brake pipe, a main reservoir for supplying fluid under pressure to said brake pipe, a feed valve device having a control chamber and operative in response to fluid pressure in said chamber to limit the pressure of fluid supplied from said main reservoir to said brake pipe, a brake valve device having a position for opening a communication between said feed valve device and said brake pipe, and a selector cock interposed between said communication and said control chamber only when said brake valve device is in said position, said cock being operable to one position in which said communication is connected to said control chamber and being operable to another position in which said communication is cut off from said control chamber and said control chamber is connected to atmosphere.

7. In a fluid pressure brake, in combination, a brake pipe, a main reservoir for supplying fluid under pressure to the brake pipe, a feed valve device having a control chamber and operative in response to fluid pressure in said chamber to limit the pressure of fluid supplied from said main reservoir to said brake pipe, and a brake valve device comprising a rotary valve and a selector cock, said rotary valve having a position in which a cavity therein opens a communication between said feed valve device and said brake pipe and a port therein connects said control chamber to said selector cock, and said selector cock being operable to one position to connect said port to said communication and being operable to another position to connect said port to the atmosphere.

8. In a fluid pressure brake, in combination, a brake pipe, a main reservoir, a feed valve device having a supply valve means responsive to a reduction in fluid pressure acting thereon to supply fluid under pressure from the main reservoir to the brake pipe and having a regulating valve means subject to the pressure of fluid supplied to the brake pipe for varying the fluid pressure acting upon said supply valve means, a selector cock operable to a position in which fluid under pressure is supplied to said regulating valve means and operable to another position in which the fluid pressure acting upon said regulating valve means is reduced to atmosphere, and a brake valve device having a position in which the pressure of fluid supplied to the brake pipe is communicated to said selector cock.

9. In a fluid pressure brake, in combination, a brake pipe, a main reservoir for supplying fluid under pressure to the brake pipe, a feed valve device having a supply valve means responsive to a reduction in fluid pressure acting thereon to supply fluid under pressure from the main reservoir to the brake pipe and a regulating valve means subject to the pressure of fluid supplied to the brake pipe for varying the fluid pressure acting upon said supply valve means, a brake valve device having a position for supplying fluid under pressure from the feed valve device to the brake pipe, and selectively operated valve means for reducing the fluid pressure acting upon said regulating valve means to atmosphere when the brake valve device is in said position.

10. In a fluid pressure brake, in combination, a brake pipe, a main reservoir for supplying fluid under pressure to the brake pipe, a feed valve device having a supply valve means responsive to a reduction in fluid pressure acting thereon to supply fluid under pressure from the main reservoir to the brake pipe and a regulating valve means subject to the pressure of fluid supplied to the brake pipe for varying the fluid pressure acting upon said supply valve means, a brake valve device having a position for supplying fluid under pressure from the feed valve device to the brake pipe, and valve means operative with said brake valve device in said position, to reduce the pressure of fluid acting upon said regulating valve means to atmosphere.

11. In a fluid pressure brake, in combination, a brake pipe, a main reservoir for supplying fluid under pressure to the brake pipe, a feed valve device having a supply valve means responsive to a reduction in fluid pressure acting thereon to supply fluid under pressure from the main reservoir to the brake pipe and a regulating valve means subject to the pressure of fluid supplied to the brake pipe for varying the fluid pressure acting upon said supply valve means, a brake valve device having a position for supplying fluid under pressure from the feed valve device to the brake pipe, selective valve means for determining the operation of said feed valve device when said brake valve device is in said position, said selective valve means having one position in which the pressure of fluid being supplied to the brake pipe is communicated from the brake valve device to the regulating valve means and another position in which the fluid pressure acting upon said regulating valve is reduced to atmosphere.

GLENN T. McCLURE.

REFERENCES CITED

The following references are of record in the file of this patent:

UNITED STATES PATENTS

| Number | Name | Date |
| --- | --- | --- |
| 1,114,822 | Turner | Oct. 27, 1914 |